US012576510B2

(12) United States Patent
Matsudo

(10) Patent No.: US 12,576,510 B2
(45) Date of Patent: Mar. 17, 2026

(54) ROBOT CONTROL SYSTEM

(71) Applicant: DENSO WAVE INCORPORATED, Chita-gun (JP)

(72) Inventor: Anna Matsudo, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 156 days.

(21) Appl. No.: 18/324,554

(22) Filed: May 26, 2023

(65) Prior Publication Data

US 2023/0381950 A1 Nov. 30, 2023

(30) Foreign Application Priority Data

May 26, 2022 (JP) ................................. 2022-086364

(51) Int. Cl.
B25J 9/00 (2006.01)
B25J 9/16 (2006.01)

(52) U.S. Cl.
CPC ........... B25J 9/0081 (2013.01); B25J 9/1664 (2013.01); B25J 9/1674 (2013.01)

(58) Field of Classification Search
CPC ...... B25J 9/0081; B25J 9/1664; B25J 9/1674; B25J 9/1671; B25J 9/1605; G05B 2219/40515; G05B 19/42; G05B 19/409
See application file for complete search history.

(56) References Cited

U.S. PATENT DOCUMENTS

| | | | |
|---|---|---|---|
| 2003/0045964 A1* | 3/2003 | Lottgen ................ | G05B 19/409 |
| | | | 700/173 |
| 2005/0049749 A1 | 3/2005 | Watanabe et al. | |
| 2015/0045949 A1 | 2/2015 | Hashiguchi et al. | |
| 2015/0314445 A1 | 11/2015 | Naitou et al. | |
| 2017/0014999 A1 | 1/2017 | Noue et al. | |
| 2018/0215040 A1 | 8/2018 | Asahara et al. | |
| 2019/0070730 A1* | 3/2019 | Morioka ................ | B25J 9/1666 |
| 2019/0329405 A1* | 10/2019 | Atohira ................... | G06T 17/00 |
| 2020/0306976 A1 | 10/2020 | Yuelai et al. | |
| 2021/0060772 A1 | 3/2021 | Inaba | |
| 2021/0170591 A1 | 6/2021 | Kurihara et al. | |
| 2023/0182292 A1 | 6/2023 | Namiki et al. | |

FOREIGN PATENT DOCUMENTS

| EP | 3379410 A1 | 9/2018 |
|---|---|---|
| JP | 2019-177435 A | 10/2019 |

* cited by examiner

*Primary Examiner* — Bao Long T Nguyen
(74) *Attorney, Agent, or Firm* — Oliff PLC

(57) ABSTRACT

A robot control system displays, on the display, information relating to a robot, sets a limit parameter set for limiting a motion of the robot based on an input by a user, the limit parameter set corresponding to a scene in which the robot moves, and executes a motion program of the robot, where execution of the motion program: (a) applies the limit parameter set to the robot, and switches the limit parameter set applied to the robot, (b) controls a motion of the robot according to the limit parameter set applied to the robot, and (c) stops execution of the motion program prior to switching from a first limit parameter set, which is the limit parameter set, to a second parameter set, which is a limit parameter set that is different from the first limit parameter set, and displays the second limit parameter set on the display.

12 Claims, 9 Drawing Sheets

|  | MAXIMUM SPEED | MAXIMUM TORQUE | MOVABLE RANGE |
|---|---|---|---|
| DefaultScene | 20 | 20 | 20 |
| Scene1 | 60 | 60 | 60 |
| Scene2 | 50 | 50 |  |

SCENE SETTING MONITOR

SCENE  1

SPEED —

TORQUE —

APPLY (A)    DISCARD (D)

| PARAMETER | VALUE |
|-----------|-------|
| MAXIMUM SPEED | 6 0 |
| MAXIMUM TORQUE | 6 0 |

(Top)
01 'TITLE " ROBOT PROGRAM "
02
03  Sub Main
04   TakeArm Keep=0
05
06   move p,p[0]      'MOVE TO P0
07
△08   ChangeScene1    'SWITCH SCENE
09
10   move p,p[1]      'MOVE TO P1
11
12   move p,p[2]      'MOVE TO P2
13
14
15  End Sub
16

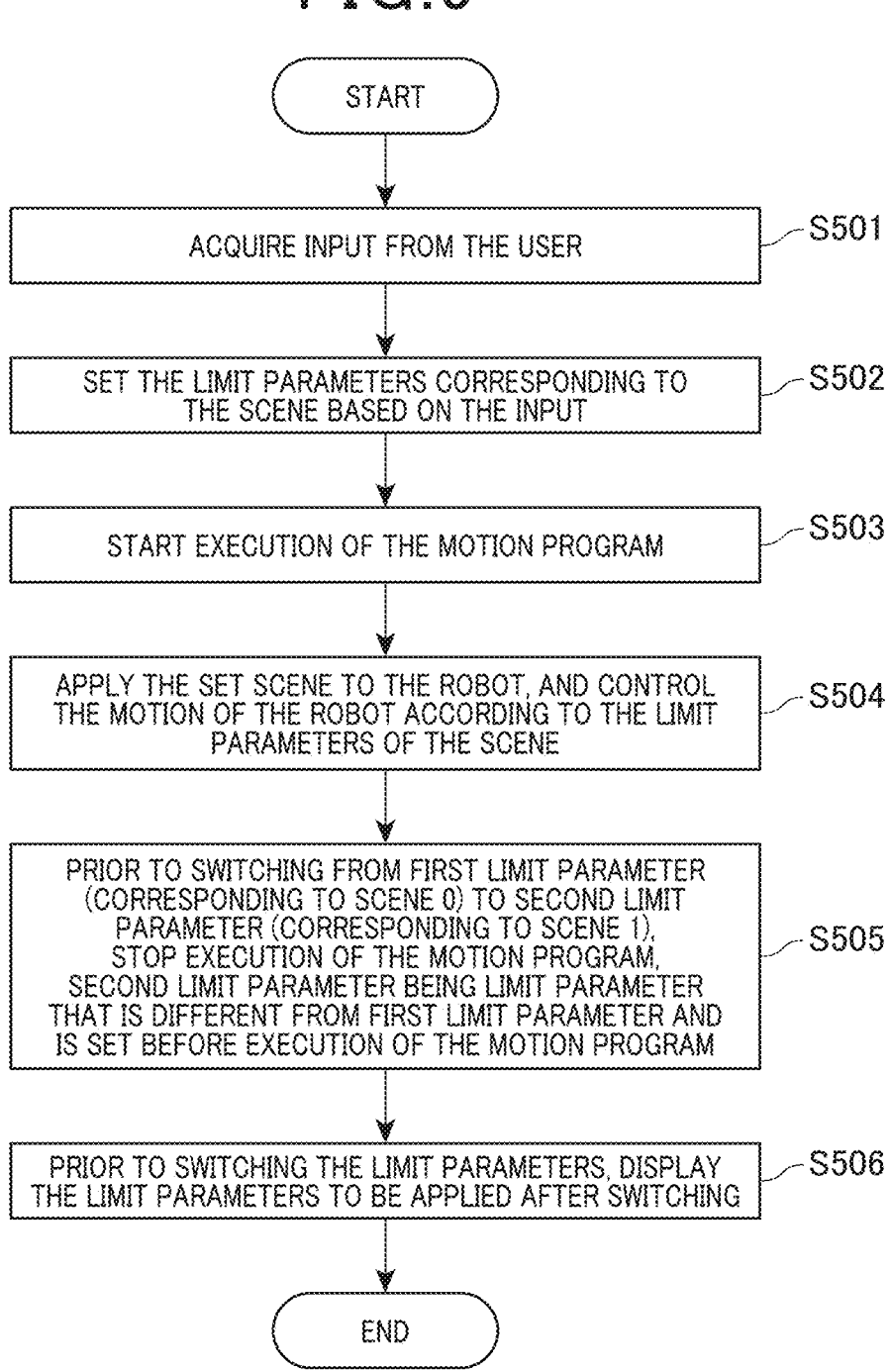

START

S501 — ACQUIRE INPUT FROM THE USER

S502 — SET THE LIMIT PARAMETERS CORRESPONDING TO THE SCENE BASED ON THE INPUT

S503 — START EXECUTION OF THE MOTION PROGRAM

S504 — APPLY THE SET SCENE TO THE ROBOT, AND CONTROL THE MOTION OF THE ROBOT ACCORDING TO THE LIMIT PARAMETERS OF THE SCENE

S505 — PRIOR TO SWITCHING FROM FIRST LIMIT PARAMETER (CORRESPONDING TO SCENE 0) TO SECOND LIMIT PARAMETER (CORRESPONDING TO SCENE 1), STOP EXECUTION OF THE MOTION PROGRAM, SECOND LIMIT PARAMETER BEING LIMIT PARAMETER THAT IS DIFFERENT FROM FIRST LIMIT PARAMETER AND IS SET BEFORE EXECUTION OF THE MOTION PROGRAM

S506 — PRIOR TO SWITCHING THE LIMIT PARAMETERS, DISPLAY THE LIMIT PARAMETERS TO BE APPLIED AFTER SWITCHING

END

ROBOT CONTROL SYSTEM

CROSS-REFERENCE TO RELATED APPLICATION

This application is based on and claims the benefit of priority from earlier Japanese Patent Application No. 2022-086364 filed May 26, 2022, the description of which is incorporated herein by reference.

BACKGROUND OF THE INVENTION

Technical Field of the Invention

The present disclosure relates to a robot control system.

Related Art

Conventionally, there is a robot control device provided with an upper limit value changing unit that changes at least one of a speed upper limit value and an acceleration upper limit value of a robot according to the type and number of workpieces gripped by a hand, and a motion control unit that controls the motion of the robot such that the speed upper limit value and the acceleration upper limit value set by the upper limit value changing unit are not exceeded (see Patent Literature 1: JP 2017-24095 A).

SUMMARY

It is desirable that limit parameters for limiting the motion of the robot, such as the speed upper limit value described above, are set according to the scene in which the robot is moving. However, in addition to the type and number of workpieces, a scene is a combination of various factors such as the presence or absence of cooperation between the robot and a human and the surrounding environment of the robot. Therefore, the number of such scenes is enormous. In Patent Literature 1, factors other than the type and number of workpieces are not considered. When it is assumed that the user individually sets the limit parameters for such an enormous number of scenes, the user workload associated with setting the limit parameters increases. As a result, the user may incorrectly set the limit parameters.

The present disclosure has been made in order to solve the problems described above, and a primary object thereof is to provide a robot control system that is capable of preventing the robot from moving using an incorrectly set limit parameter even when a limit parameter for limiting the motion of the robot is incorrectly set.

Solution to Problem

According to an embodiment of the present disclosure, there is provided a robot control system comprising a processor, a memory, and a display, wherein the memory stores a program that is executed by the processor, and the processor displays, on the display, information relating to a robot, sets a limit parameter set for limiting a motion of the robot based on an input by a user, the limit parameter set corresponding to a scene in which the robot moves, and executes a motion program of the robot, where execution of the motion program: (a) applies the limit parameter set to the robot, and switches the limit parameter set applied to the robot, (b) controls a motion of the robot according to the limit parameter set applied to the robot, and (c) stops execution of the motion program prior to switching from a first limit parameter set, which is the limit parameter set, to a second parameter set, which is a limit parameter set that is different from the first limit parameter set, and displays the second limit parameter set on the display.

As a result, it is possible to cause the user to, prior to switching the scene that is applied to the robot, confirm the limit parameters that will be applied after the scene is switched. Therefore, the user is more likely to notice an error in the set limit parameters, and an incorrect limit parameter can be more easily corrected. Consequently, it is possible to prevent the robot from moving in a state where there is an error in the limit parameters. In other words, even when a limit parameter for limiting the motion of the robot is incorrectly set, it is possible to prevent the robot from moving using the incorrectly set limit parameters.

BRIEF DESCRIPTION OF THE DRAWINGS

FIG. 2 shows limit parameters of each scene according to an embodiment of the present disclosure.

FIG. 6 shows the relationship between a main scene and a sub-scene according to an embodiment of the present disclosure.

FIG. 9 is a flowchart of a robot control system according to an embodiment of the present disclosure.

DETAILED DESCRIPTION OF THE PREFERRED EMBODIMENTS

Figure 1:
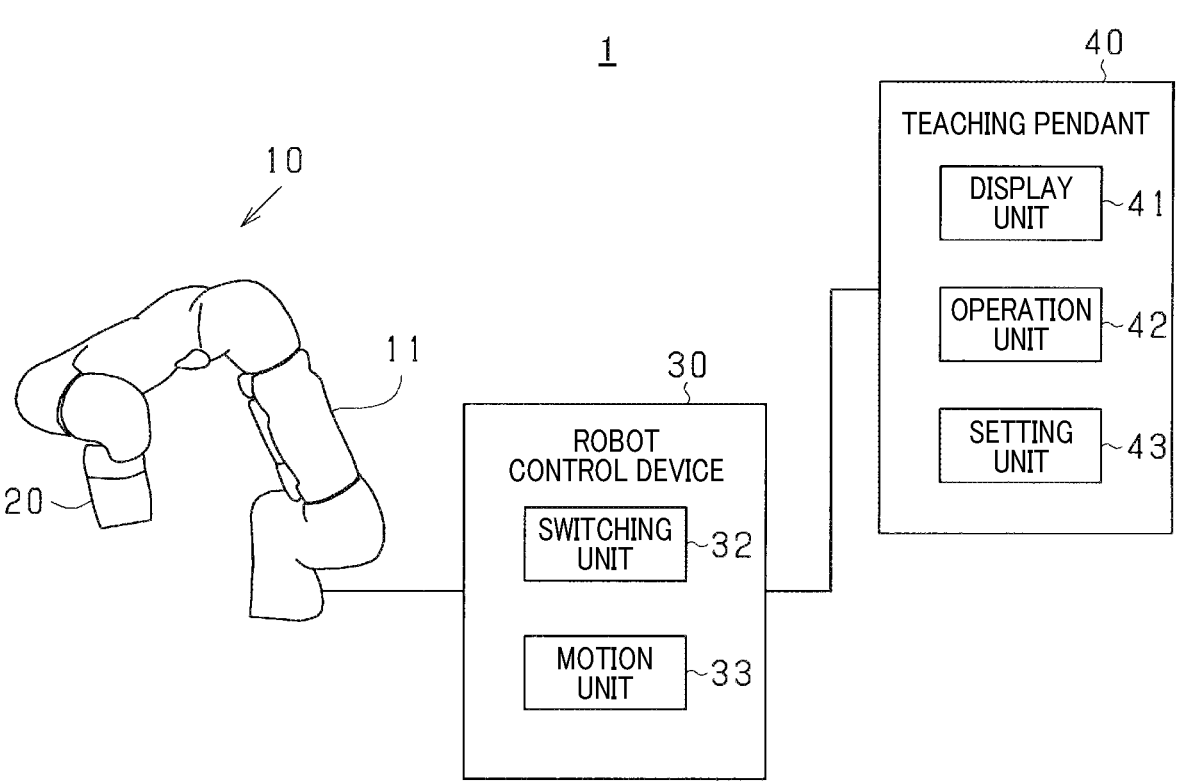
FIG. 1 shows a robot control system according to an embodiment of the present disclosure including a robot, a robot control device, and a teaching pendant.

Hereinafter, a robot that cooperates with humans, and a robot control system that controls the robot will be described as a robot control system 1 according to an embodiment of the present disclosure with reference to the drawings. As shown in FIG. 1, the robot control system 1 includes a robot 10, a robot control device 30, and a teaching pendant 40.

As shown in FIG. 1, the robot 10 is, for example, a vertical articulated robot, and is provided with an arm 11. Adjacent links of the arm 11 are joined in a relatively rotatable fashion via joints. Each joint (that is, each shaft) is driven by a motor that corresponds to the joint. Each joint of the robot 10 is provided with an encoder (not shown) that detects the rotation angle of each joint, a torque sensor (not shown) that detects the torque of each joint, and the like. The robot 10 is not limited to a vertical articulated robot, and may be a horizontal articulated robot.

A hand 20 is attached to the front end of the arm 11. The hand 20 (that is, the tool) includes, for example, a pair of claws, and performs an opening and closing motion that expands and contracts the spacing between the pair of claws.

A workpiece is gripped by the opening and closing motion of the pair of claws of the hand 20.

Figure 8:
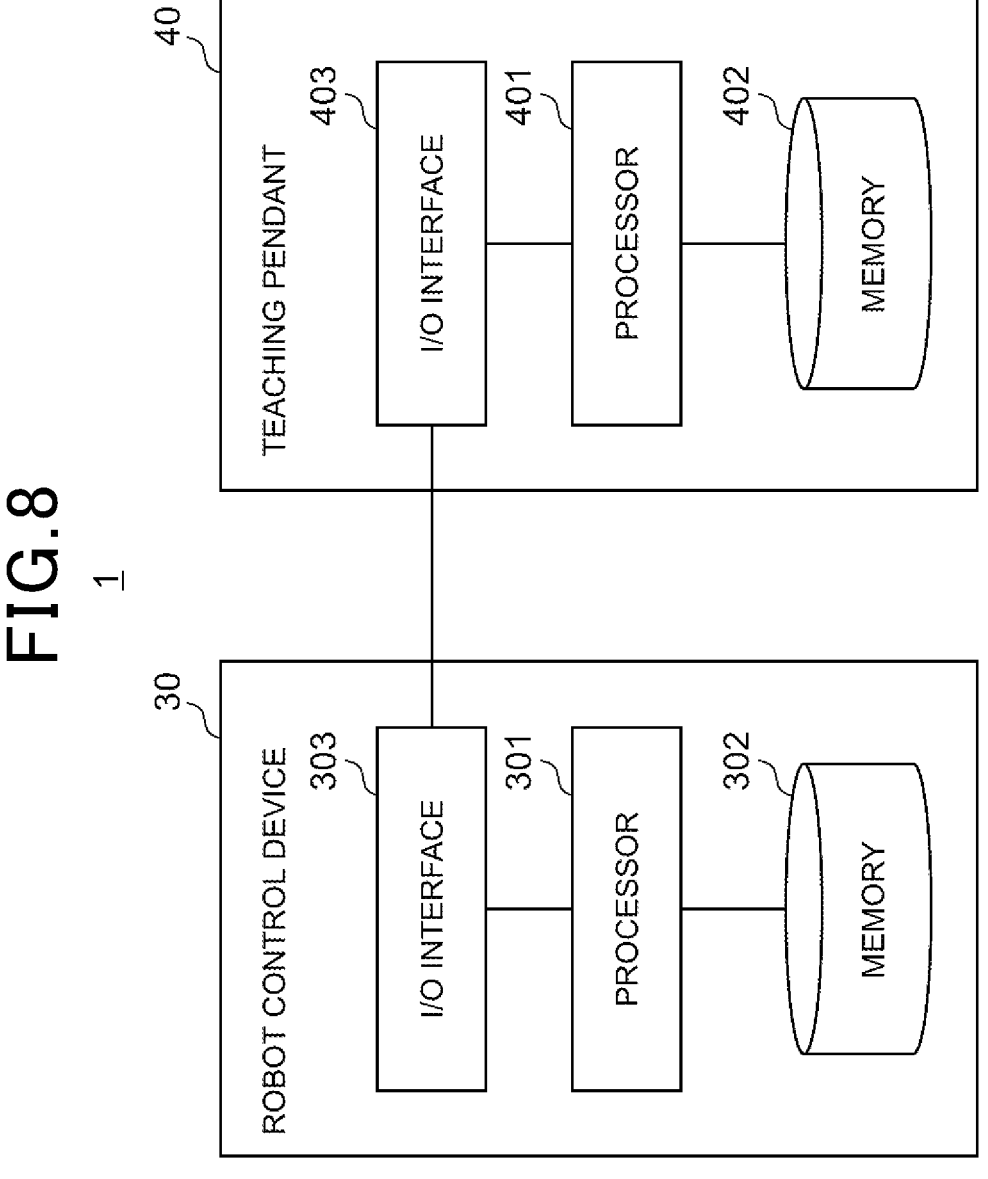
FIG. 8 shows a hardware configuration relating to control of a robot control system according to an embodiment of the present disclosure.

As shown in FIG. 8, the robot control device 30 may be provided with a processor 301 such as a CPU (central processing unit) including a circuit, a memory 302 such as a ROM (read only memory) and a RAM (random access memory), and an input/output interface 303. The robot control device 30 is connected to the robot 10. The robot control device 30 is provided with a switching unit 32 and a motion unit 33. The robot control device 30 realizes the functions of the switching unit 32 and the motion unit 33 and controls the motion of the robot 10 by executing a motion program that causes the robot 10 to move. The robot control device 30 may be built into the robot 10.

The teaching pendant 40 (that is, the operation device) includes a display unit 41, an operation unit 42, and a setting unit 43. The display unit 41 is a display such as a liquid crystal panel, and provides a display relating to the robot 10. The operation unit 42 includes an input interface such as keys, buttons, and dials operated by the user. The setting unit 43 treats the limit parameter set for limiting the motion of the robot 10 as a scene, and sets the limit parameter set based on input from the user. Hereinafter, setting and applying the limit parameter set are respectively also referred to as setting and applying a scene. As shown in FIG. 9, the teaching pendant 40 may be provided with a processor 401 such as a CPU including circuits, a memory 402 such as a ROM and a RAM, and an input/output interface 403.

Input by the user is performed using, for example, the teaching pendant 40 connected to the robot control device 30. The limit parameters include, for example, a movable range of the robot 10 (that is, a movable angle of a target joint), a maximum speed of a monitored part of the robot 10, a maximum torque of a target joint of the robot 10, and the like. A scene corresponds to a combination of a plurality of limit parameters (that is, a limit parameter set). The switching unit 32 switches the scene applied to the robot 10. The motion unit 33 causes the robot 10 to move in a state where the motion of the robot 10 is limited by the limit parameter set corresponding to the scene applied to the robot 10.

The teaching pendant 40 is provided with a simulator, which is a function that simulates the motion of the robot 10 and the operation of the robot control device 30. The simulator executes the motion program of the robot 10 to realize the functions of the switching unit 32 and the motion unit 33 of the robot control device 30 and simulate the operation of the robot control device 30. The simulator simulates the motion of the robot 10 based on signals from the simulated switching unit 32 and motion unit 33. The display unit 41 displays a simulation image of the robot 10 and the motion program. The user can create (or edit) the motion program of the robot 10 by operating the teaching pendant 40.

FIG. 2 shows, for each scene, a scene name representing the name of the scene, and a limit parameter set. In the example of FIG. 2, the limit parameter set includes a maximum speed, a maximum torque, and a movable range. Note that the limit parameter set for each scene may include limit parameters other than the illustrated limit parameters. Furthermore, parameters other than the limit parameters may be set to each scene.

DefaultScene is initially set in the robot control device 30. DefaultScene is neither set nor changed by the user. In DefaultScene, the values of the maximum speed, the maximum torque, and the movable range are initially set to values that allow the robot 10 to move safely. In the example of FIG. 2, the maximum speed of the monitored part of the robot 10 is limited to 20 or less, the maximum torque of the torque generated by a target joint of the robot 10 is limited to 20 or less, and the movable range of the robot 10 is limited to 20 or less. Note that the values of the maximum speed, the maximum torque, and the movable range described above are examples, and the specific values are arbitrary. The switching unit 32 applies DefaultScene to the robot 10 when the robot control device 30 (that is, the robot control system 1) is started. That is, when the robot control device 30 is started, the values of the limit parameters applied to the robot 10 are initial values that enable the robot 10 to move safely. The motion unit 33 causes the robot 10 to move in a state where the motion of the robot is limited by the limit parameters in DefaultScene. Note that, in the simulation, DefaultScene is applied to the robot 10 prior to execution or at the start of execution of the motion program.

Scene 1 and Scene2 are registered (that is, set) in advance prior to execution of the motion program of the robot 10. The scene names Scene 1 and Scene2, and the limit parameters are entered and set in an application that is different from the motion program application of the robot 10. For example, the scene names and the limit parameters are input by the user by using the operation unit 42 of the teaching pendant 40, and are associated and registered (that is, set) by the setting unit 43. That is, the setting unit 43 associates the scene names and the limit parameters entered by the user, and registers the associated scene names and limit parameters before creation of the motion program. The scene name and the limit parameters entered by the user being associated and registered by the setting unit 43 corresponds to the setting unit 43 setting the scene based on the limit parameters entered by the user. In Scene1, for example, the maximum speed is set to a value of 60, the maximum torque is set to a value of 60, and the value of the movable range is set to a value of 60. In Scene2, for example, the maximum speed is set to a value of 50 and the maximum torque is set to a value of 50, and the value of the movable range is not set. That is, in Scene 2, the movable range is not limited. Note that, at the point where the limit parameters of Scene1 and Scene2 are registered, the motion program has not been executed yet. Thus, the switching unit 32 does not switch the scene that is applied to the robot 10 to Scene1 or Scene2. For example, the robot 10 maintains a state where DefaultScene is applied.

Figure 3:
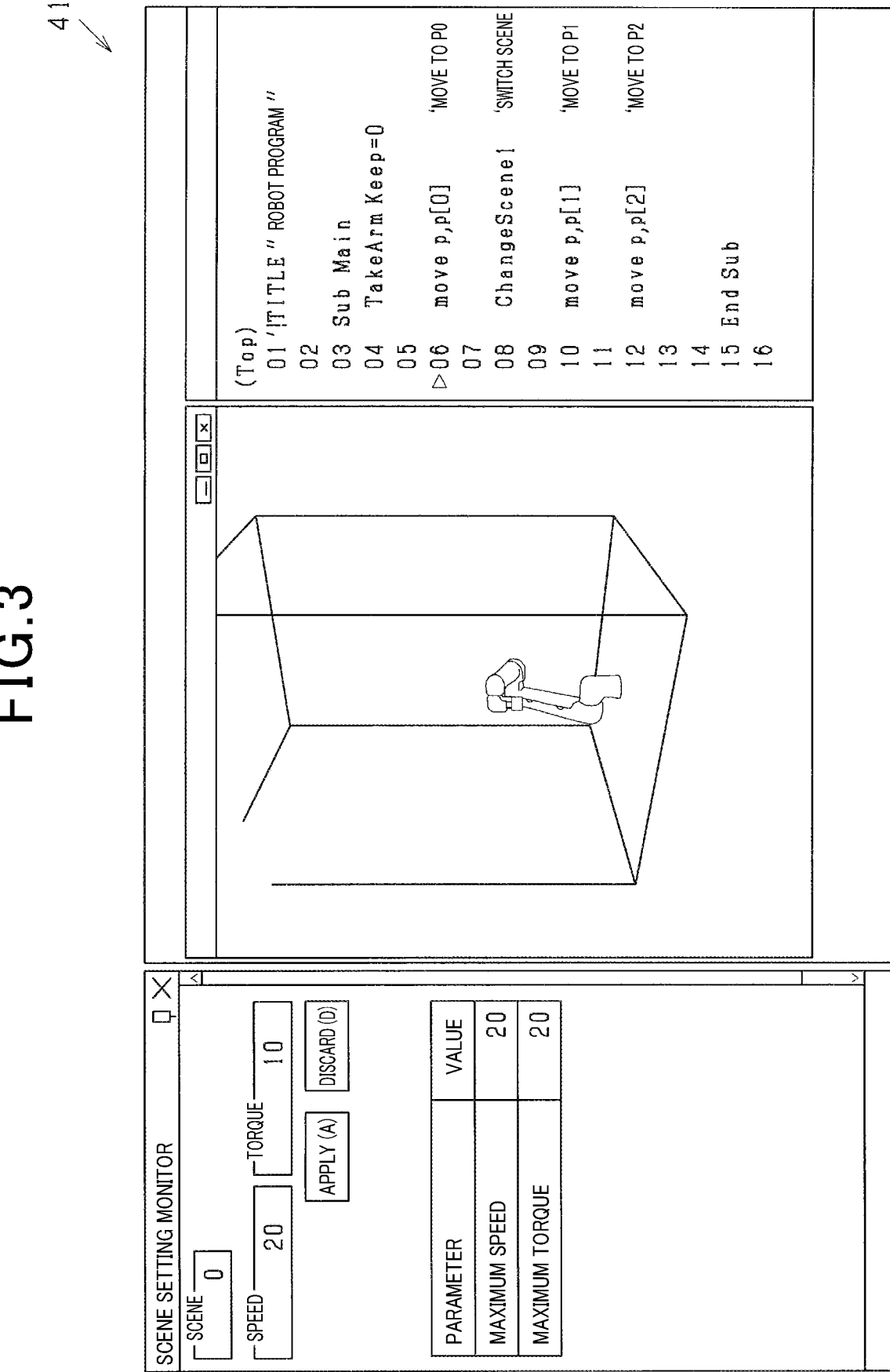
FIG. 3 shows a motion program during execution and limit parameters of a scene prior to switching according to an embodiment of the present disclosure.

FIG. 3 shows a motion program during execution and limit parameters of a scene prior to switching. The screen in FIG. 3 is displayed by the display unit 41 of the teaching pendant 40. That is, FIG. 3 shows the motion of the robot 10 (that is, a simulation image of the robot 10) that is simulated by the teaching pendant 40. In FIG. 3, an example is shown in which the motion program of the robot 10 is defined by a text programming language. The motion program may define the scenes that are applied to the robot, and the order of the scenes.

The right side of the screen that is displayed by the display unit 41 displays the motion program of the robot 10. Here, a state is shown where the command move p, p(0) on the sixth line of the motion program is being executed. The triangle symbol on the left side of the sixth line indicates the line (that is, the command) that is currently being executed. The command move p, p(0) moves the front end (that is, the reference point) p of the arm 11 of the robot 10 to the position p(0).

The center of the screen that is displayed by the display unit 41 displays a simulation image of the robot 10. The current state of the simulation image of the robot 10 is displayed during execution of the motion program.

The left side of the screen that is displayed by the display unit 41 displays a scene setting monitor (that is, a scene setting screen). The scene setting monitor displays the scene number, the current speed of the monitored part of the robot 10, the current torque of the target joint of the robot 10, the maximum speed, and the maximum torque. Here, the current speed of 20 and the current torque of 10 of the robot 10 is displayed during execution of the command move p, p(0). During execution of the motion program (that is, during execution of a simulation) the maximum speed and the maximum torque represent the maximum speed and the maximum torque that are set in the scene that is currently applied to the robot 10. For example, when DefaultScene is applied to the robot 10 when the robot control device 30 is started and the scene has not been switched thereafter, as shown in FIG. 2, the maximum speed is 20 and the maximum torque is 20.

Figure 4:
FIG. 4 shows a motion program during execution and limit parameters of a scene after switching according to an embodiment of the present disclosure.

FIG. 4 shows a motion program during execution and limit parameters of a scene after switching.

The right side of the screen that is displayed by the display unit 41 displays the motion program of the robot 10. Here, a state is shown where execution of the motion program is temporarily stopped at the command ChangeScene1 on the eighth line of the motion program. The triangle symbol on the left side of the eighth line indicates the line (that is, the command) whose execution is currently temporarily stopped.

ChangeScene is a command that executes setting and switching of a scene. More specifically, ChangeScene may set (that is, create) a scene and switch to the set scene by specifying the values of the limit parameters. ChangeScene may switch to a scene having a specified scene name or scene number by specifying the scene name or scene number of a scene that has been set in advance as described above. ChangeScene may set a scene and a scene name or scene number as a result of specifying a scene name or scene number and specifying the values of the limit parameters, and then switch to the set scene. The setting unit 43 checks the motion program and prepares for execution. For example, when the motion program is created, the setting unit 43 recognizes ChangeScene in the motion program, and sets the motion program including ChangeScene to an executable state. Setting a scene by specifying the limit parameters in ChangeScene during creation of the motion program, or specifying a scene by specifying a preset scene corresponds to the setting unit 43 setting a scene based on limit parameters input by the user. Therefore, in a broad sense, ChangeScene being defined (that is, input) by the user in the motion program and the setting unit 43 recognizing ChangeScene (or the setting unit 43 setting the motion program including ChangeScene to an executable state) corresponds to the setting unit 43 setting a scene based on limit parameters input by the user. Note that an executable state of the motion program is a state prior to compiling the completed motion program, a state after compiling the motion program, or the like. In the following description, as shown in FIG. 2, it is assumed that the limit parameters of DefaultScene, Scene1 and Scene2 are registered.

If a registered scene name or scene number is specified in the motion program, the switching unit 32 switches the values of the limit parameters to the values of the limit parameters that are associated with the specified scene name or scene number.

That is, when ChangeScene1 is executed, because the scene number 1 that has been registered is specified, the switching unit 32 switches the values of the maximum speed, the maximum torque, and the movable range to the values 60, 60 and 60 for Scene1 as shown in FIG. 2. In other words, the switching unit 32 switches the scene that is applied to the robot 10 from the current scene to Scene1.

Here, during execution of the motion program of the robot 10, the switching unit 32 temporarily stops execution of the motion program prior to switching the scene, and displays the limit parameters that have been set to the scene to be applied to the robot 10 on the scene setting monitor positioned on the left side of the screen displayed by the display unit 41. As a result, the scene setting monitor displays the scene number 1, and the maximum speed of 60 and the maximum torque of 60 that are set to Scene1, which is to be applied to the robot 10.

At this time, the center of the screen displayed by the display unit 41 displays a simulation image representing the state of the robot 10 after switching the scene (or prior to switching the scene).

When the switching unit 32 causes the display unit 41 to display the limit parameters that have been set to Scene1, which is to be applied to the robot 10, it displays the scene setting monitor including the limit parameters in a position that does not overlap the simulation image of the robot 10.

Furthermore, when the switching unit 32 causes the display unit 41 to display the limit parameters that have been set to Scene1, which is to be applied to the robot 10, it displays the scene setting monitor including the limit parameters in the foreground. In this way, the scene setting monitor may be displayed so as to overlap the simulation image of the robot 10.

After temporarily stopping execution of the motion program, the switching unit 32 maintains the state in which execution of the motion program is temporarily stopped until the user clicks an apply icon. That is, the switching unit 32 maintains the state in which execution of the motion program is temporarily stopped until an operation to resume the motion program is performed by the user. The user confirms the values of the maximum speed and the maximum torque in Scene1 in the scene setting monitor, and clicks the apply icon if there is no problem.

When execution of the motion program is temporarily stopped by the switching unit 32, the setting unit 43 makes the maximum speed and the maximum torque that are displayed in the scene setting monitor (that is, the left side of the screen displayed by the display unit 41) editable. If the maximum speed and the maximum torque are input by the user in the scene setting monitor, the maximum speed and the maximum torque of Scene1 that are registered as shown in FIG. 2 are changed. The user clicks the apply icon if there is no problem. As a result, the input of the maximum speed and the maximum torque is confirmed, and the maximum speed and the maximum torque of the registered Scene1 are changed to the input values. Note that, when execution of the motion program is temporarily stopped by the switching unit 32, the setting unit 43 may cause a transition to the limit parameter change screen shown in FIG. 2.

When the user clicks the apply icon, the settings shown in the scene setting monitor are applied to the robot 10. Then, execution of the motion program is resumed, and the next command, move p, p(1) is executed. On the other hand, if the user clicks a discard icon, the values of the maximum speed and the maximum torque that have been input are discarded, and the values of the maximum speed and the maximum torque are returned to the values prior to editing (that is, the values that are already set). In this case, the temporarily stopped state is continued.

The processing performed by the robot control system 1 according to an embodiment of the present disclosure will be described with reference to FIG. 9.

The robot control system 1 acquires input from the user (step S501). For example, the setting unit 43 acquires input from the user via the operation unit 42. The input from the user is a scene name and limit parameters.

The robot control system 1 sets the limit parameters corresponding to the scene based on the input from the user (step S502). For example, the setting unit 43 sets the limit parameters input for the scene whose scene name has been input by the user. The scenes in which limit parameters have been set are specified using the scene names in the motion program.

The robot control system 1 starts execution of the motion program (step S503). For example, the simulator starts a simulation. When the simulation starts, the simulated robot control device 30 starts execution of the motion program.

The robot control system 1 applies the set scene to the robot 10, and controls the motion of the robot 10 according to the limit parameters of the scene that has been applied (step S504). For example, the switching unit 32 applies the scene defined in the motion program to the robot. The motion unit 33 causes the robot 10 to move according to the limit parameters of the scene that has been applied.

When the robot control system 1 switches the limit parameters, it temporarily stops execution of the motion program (step S505). For example, when switching of the scene is instructed in the motion program, the switching unit 32 temporarily stops execution of the motion program.

Prior to switching the limit parameters, the robot control system 1 displays the limit parameters to be applied after switching (step S506). For example, the switching unit 32 displays the limit parameters after switching on the display unit 41 while execution of the motion program is temporarily stopped.

The present embodiment described above has the following advantages.

The setting unit 43 sets a scene that includes, as configuration elements, a plurality of limit parameters for limiting the motion of the robot 10 based on limit parameters input by the user. Consequently, by inputting the plurality of limit parameters, which are the configuration elements of the scene, the user can collectively set the plurality of limit parameters for the whole scene. The switching unit 32 switches the scene that is applied to the robot 10 from the current scene to another scene. Consequently, as a result of switching the scene that is applied to the robot 10, the plurality of limit parameters that are applied to the robot 10 can be switched at once, and the plurality of limit parameters can be easily changed. The motion unit 33 causes the robot 10 to move in a state where the motion of the robot 10 is limited by the limit parameters set to the scene applied to the robot 10. Therefore, the robot 10 can be appropriately controlled based on the set limit parameters.

During execution of the motion program of the robot 10, the switching unit 32 temporarily stops execution of the motion program prior to switching the scene, and displays the limit parameters (such as a maximum speed of 60, and a maximum torque of 60) that have been set to the scene to be applied to the robot 10 (such as Scene 1) on the display unit 41. In other words, according to an embodiment of the present disclosure, there is provided a robot control system 1 comprising a processor (e.g. processor 301 and processor 401), a memory (e.g. memory 302 and memory 402), and a display (e.g. display unit 41), wherein the memory stores a program that is executed by the processor, and the processor displays, on the display, information relating to a robot 10, sets a limit parameter set for limiting a motion of the robot 10 based on an input by a user, the limit parameter set corresponding to a scene in which the robot 10 moves, and executes a motion program of the robot 10, where execution of the motion program: (a) applies the limit parameter set to the robot 10, and switches the limit parameter set applied to the robot 10, (b) controls a motion of the robot 10 according to the limit parameter set applied to the robot 10, and (c) stops execution of the motion program prior to switching from a first limit parameter set, which is the limit parameter set, to a second parameter set, which is a limit parameter set that is different from the first limit parameter set, and displays the second limit parameter set on the display. As a result, it is possible to make the user confirm the limit parameters (such as a maximum speed of 60, and a maximum torque of 60) that have been set to Scene1 prior to the scene applied to the robot 10 being switched to Scene1. Therefore, the user is more likely to notice an error in the set limit parameters, and an incorrect limit parameter can be more easily corrected. Consequently, it is possible to prevent the robot 10 from moving in a state where there is an error in the limit parameters. Here, in the robot control system 1, when the robot 10 is moved in a state where the limit parameters are incorrect, there is a concern that the robot 10 may cause adverse effects toward the surrounding environment or humans. Therefore, it is very important to prevent the robot 10 from moving in a state where the limit parameters are incorrect.

When the switching unit 32 causes the display unit 41 to display the limit parameters (a maximum speed of 60 and a maximum torque of 60) that are set to the scene (such as Scene1) to be applied to the robot 10, it causes the display unit 41 to display the limit parameters in the foreground. In other words, the second limit parameter set is displayed in the foreground. As a result, even when the display unit 41 is displaying various information relating to the robot 10 (such as the simulation image, the motion program, and other information), the user can be made to give priority to confirming the limit parameters.

The display unit 41 displays an image (such as the simulation image) showing the motion of the robot 10. Consequently, the user is able to grasp the state of the robot 10 by viewing the simulation image of the robot 10 that is displayed by the display unit 41. Further, when the switching unit 32 causes the display unit 41 to display the limit parameters (such as a maximum speed of 60 and a maximum torque of 60) that have been set to the scene (such as Scene1) applied to the robot 10, the limit parameters are displayed in a position that does not overlap the displayed simulation image of the robot 10. In other words, information relating to the robot 10 includes an image showing the motion of the robot 10, and the second limit parameter set is displayed in a position that does not overlap the image showing the motion of the robot 10. As a result, the user is able to confirm the limit parameters while viewing the simulation image of the robot 10 that is displayed by the display unit 41. The user can confirm the state of the robot 10 that has been simulated at the point the scene is switched.

After temporarily stopping execution of the motion program, the switching unit 32 continues to temporarily stop execution of the motion program until the user performs an operation (such as clicking an apply icon) for resuming the motion program. In other words, the processor, after stopping execution of the motion program, continues to stop execution of the motion program until the user performs an operation to resume the motion program. As a result, after the limit parameters are displayed by the display unit 41, the temporarily stopped state of the execution of the motion program is maintained until the user performs an operation for resuming the motion program. Consequently, an opportunity for the user to confirm the limit parameters can be ensured prior to switching the scene, which increases the possibility of the user noticing a limit parameter that has been incorrectly set.

When execution of the motion program is temporarily stopped by the switching unit 32, the setting unit 43 makes the limit parameters displayed by the display unit 41 editable. In other words, the processor, in response to stopping execution of the motion program, makes the second limit parameter set editable. As a result, when the user notices that the limit parameter displayed by the display unit 41 has been incorrectly set, the incorrectly set limit parameter can be corrected.

During execution of the motion program, the display unit 41 displays the limit parameters (such as the maximum speed of 20 and the maximum torque of 20) of the scene (such as DefaultScene) that is applied to the robot 10. In other words, the processor displays the first limit parameter set on the display during execution of the motion program. As a result, when executing the motion program, the user is able to confirm the limit parameters of the scene that is applied. On the other hand, when the scene is switched, the user can confirm, before the scene is switched, the limit parameters (such as a maximum speed of 60 and a maximum torque of 60) that are set in the scene (such as Scene1) to be applied after switching.

The setting unit 43 allows the scene to be set as a result of the user inputting a scene name (such as Scene1) representing the name of the scene. In other words, the processor sets identification information of the limit parameter set based on an input by the user. Consequently, as a result of the user specifying the scene name (such as Scene1), it is possible to switch the limit parameters that are applied to the robot 10 to the limit parameters of the specified scene name.

The setting unit 43 associates and the scene name and the limit parameters input by the user and registers them in advance. Consequently, the user can not only set the limit parameters when setting the scene, but also set the scene name of the scene. The scene name and the limit parameters are associated, and these are registered in advance. When a registered scene name (such as Scene1) is specified in a motion program that has been edited by the user, the values of the limit parameters are switched to the values of the limit parameters (such as a maximum speed of 60, a maximum torque of 60, and a movable range of 60) that are associated with the scene name Scene 1 as shown in FIG. 2. In other words, the processor switches the limit parameter set applied to the robot 10 to the limit parameter set that is identified by the identification information specified in the motion program. Therefore, as a result of the user switching the scene in the motion program by specifying the scene name Scene1 that is registered, it is possible to easily switch the values of the limit parameters applied to the robot 10 to the values of the limit parameters of Scene1 that have been registered in advance.

When the robot control device 30 (that is, the robot control system 1) is started, the values of the limit parameters of the scene that is currently applied to the robot 10 are the values of the limit parameters of DefaultScene (such as a maximum speed of 20, a maximum torque of 20, and a movable range of 20). That is, the limit parameters when starting are initial setting values that enable the robot 10 to move safely. In other words, a value of the limit parameter set applied when the robot control system 1 is started is an initial value that causes the robot 10 to move safely. As a result, the safety when starting the robot 10 can be ensured.

The embodiment described above may be modified as follows. The parts that are the same as those of the embodiment described above are denoted by the same reference numerals, and the descriptions thereof are omitted.

When a predetermined time elapses after execution of the motion program is temporarily stopped, the switching unit 32 may assume that the user has confirmed the limit parameters and resume execution of the motion program. As a result, even if the user has not performed an operation that resumes the motion program (such as clicking an apply icon), by waiting until a predetermined time elapses after temporarily stopping execution of the motion program, an opportunity for the limit parameters to be confirmed by the user can be ensured.

When the switching unit 32 temporarily stops execution of the motion program and causes the display unit 41 to display the limit parameters that have been set to the scene to be applied to the robot 10, it may change from a state where the limit parameters are not displayed to a state where the limit parameters are displayed. For example, the switching unit 32 may change from a state where the scene setting monitor is not displayed to a state where it is displayed. In other words, the second limit parameter set is displayed using a screen for displaying the limit parameter set, and is displayed inside the screen. As a result, because the limit parameters that were not displayed are displayed together with the scene setting monitor, compared to a case where the scene setting monitor is always displayed and only the limit parameters are displayed when the scene is switched, it becomes easier to make the user focus on the limit parameters.

When the switching unit 32 temporarily stops execution of the motion program and causes the display unit 41 to display the limit parameters that have been set to the scene to be applied to the robot 10, it may change from a state where the limit parameters are displayed in a place other than the foreground to a state where the limit parameters are displayed in the foreground. For example, when the limit parameters after switching are displayed inside the scene setting monitor, the switching unit 32 may change from a state where the scene setting monitor is displayed behind the simulation image of the robot 10 to a state where the scene setting monitor is displayed in the foreground (that is, in front of the simulation image). In other words, the second limit parameter set is displayed inside a screen for displaying the limit parameter set, and the screen is displayed in the foreground when the second limit parameter set is displayed. As a result, because the screen displaying the limit parameters is displayed in the foreground when the limit parameters after switching are displayed on the screen, it becomes easier to make the user focus on the limit parameters.

When the robot control device 30 (that is, the robot control system 1) is started, limit parameters based on the previous limit parameters may be applied instead of applying the limit parameters of DefaultScene to the robot 10. For example, values obtained by multiplying a coefficient (such as ½ or ⅓) to the values of the limit parameters that were set when the previous motion of the robot 10 was completed may be applied to the robot 10.

In a case where the scene names and the limit parameters are not registered in advance (for example, when Scene1 and Scene2 are not registered in advance), the switching unit 32 may set the limit parameters applied to the robot 10 by executing commands in which the limit parameters are directly specified. For example, the switching unit 32 may execute the command ChangeScene(30,30,30) to set a scene in which the limit parameters are a maximum speed of 30, a maximum torque of 30, and a movable range of 30. As a result, it is possible to set the limit parameters in the motion program even when they are not set in advance.

Figure 5:
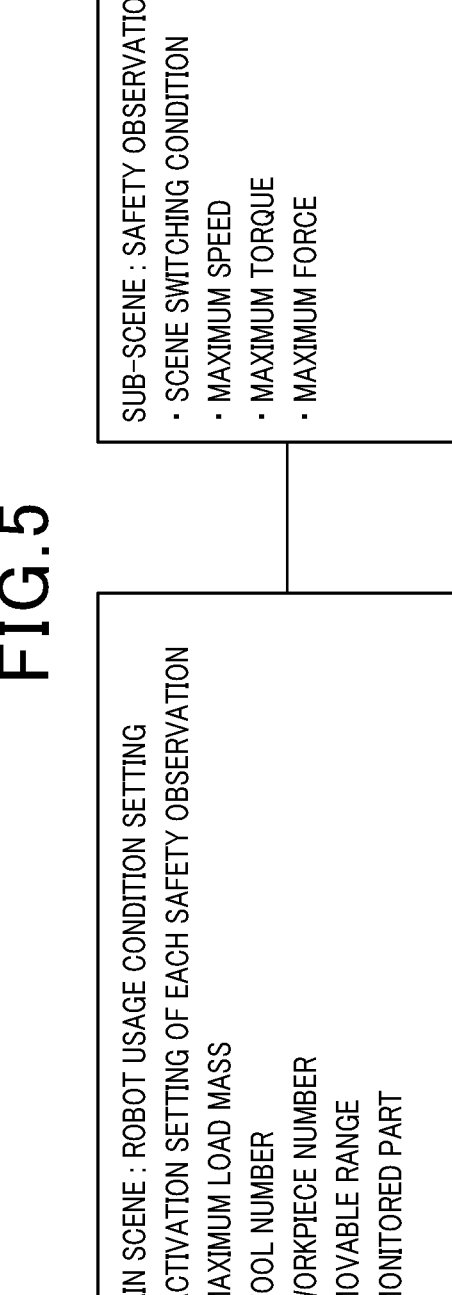
FIG. 5 shows parameters of a main scene and parameters of a sub-scene according to an embodiment of the present disclosure.
Figure 6:
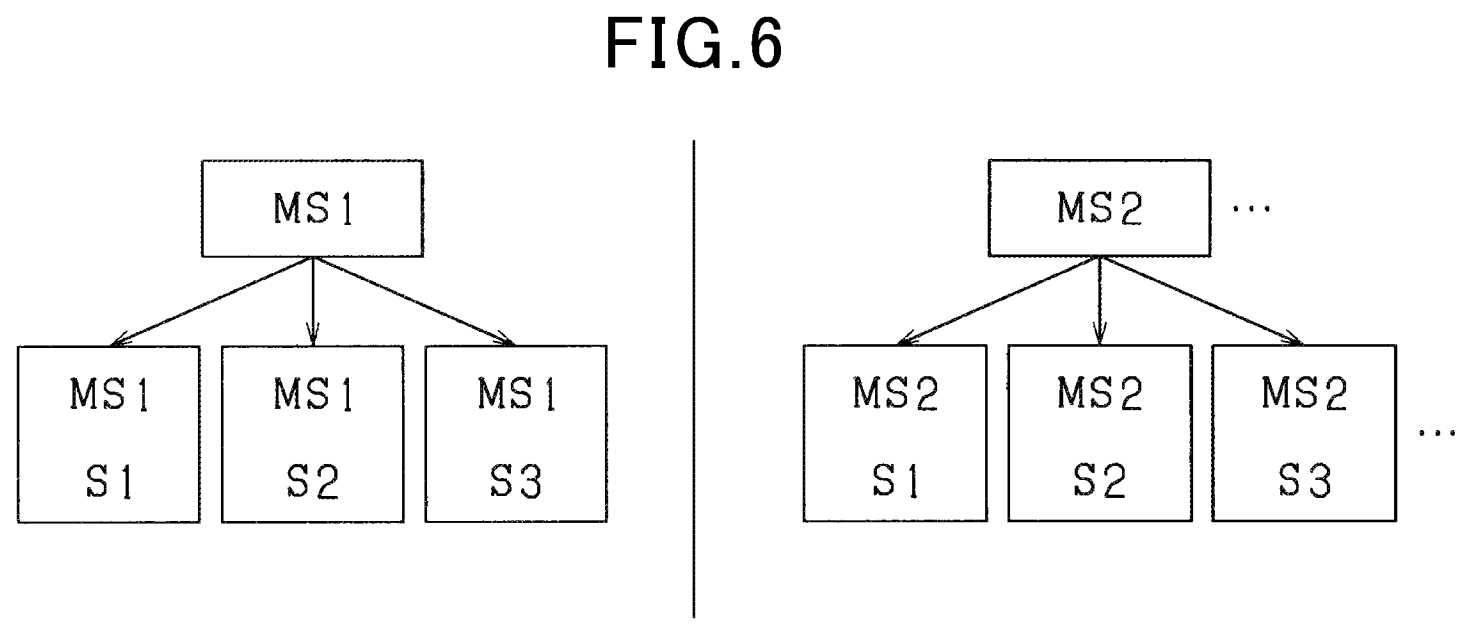

A scene may be composed of a main scene and a sub-scene. More specifically, there are a plurality of main scenes and a plurality of sub-scenes Sm that are dependent on each main scene MSn. The limit parameter set of the scene includes the limit parameter set of the main scene MSn (that is, a main parameter set) and the limit parameter set of a sub-scene Sm that is dependent on the main scene MSn (that is, a sub-parameter set). Here, n and m are natural numbers. FIG. 5 shows the parameters of the main scene MSn and the parameters of the sub-scene Sm. FIG. 6 shows the relationship between the main scene MSn and the sub-scene Sm.

For example, parameters relating to the usage conditions of the robot 10 are set in the main scene MSn, and parameters relating to safety observation are set in the sub-scene Sm. The parameters set in the sub-scene Sm are a scene switching condition, a maximum speed, a maximum torque, a maximum force, and the like. The maximum speed and the maximum torque are the same as in the embodiment described above. The scene switching condition is a condition that allows switching to that sub-scene. For example, the scene switching condition is set based on the position of the robot 10 or the like. The maximum force is, for example, the maximum value of the force that the robot 10 applies to a workpiece. The parameters set in the main scene MSn include an activation setting of a safety observation, a maximum load mass, a tool number, a workpiece number, a movable range, a monitored part, and the like. The activation setting of safety observation indicates whether the parameters relating to safety observation (such as the maximum speed) are activated or deactivated. The maximum load mass is the maximum mass of a workpiece that is moved by the robot 10. The tool number is a number representing the tool type. The workpiece number is a number representing the workpiece type. The movable range is the same as in the embodiment described above. The monitored part is a part that is monitored.

Each of the sub-scenes Sm is dependent on one of the main scenes MSn. MS1S1 represents the sub-scene S1 within (that is, in the lower level below) the main scene MS1. MS1S1, MS1S2, and MS1S3 are each dependent on the main scene MS1, and share the parameters set in the main scene MS1. Similarly, MSnSm represents the sub-scene Sm within the main Scene MSn.

Consequently, the user can organize each scene as a combination of a main scene and a plurality of sub-scenes that are dependent on the main scene. As a result, when the plurality of limit parameters are each set according to many circumstances, it is possible to prevent the user from incorrectly setting the limit parameters. Here, in the robot control device 30, when a limit parameter is incorrectly set, there is a concern that the robot 10 may cause adverse effects toward the surrounding environment or humans. Therefore, it is very important to prevent limit parameters from being incorrectly set.

Figure 7:
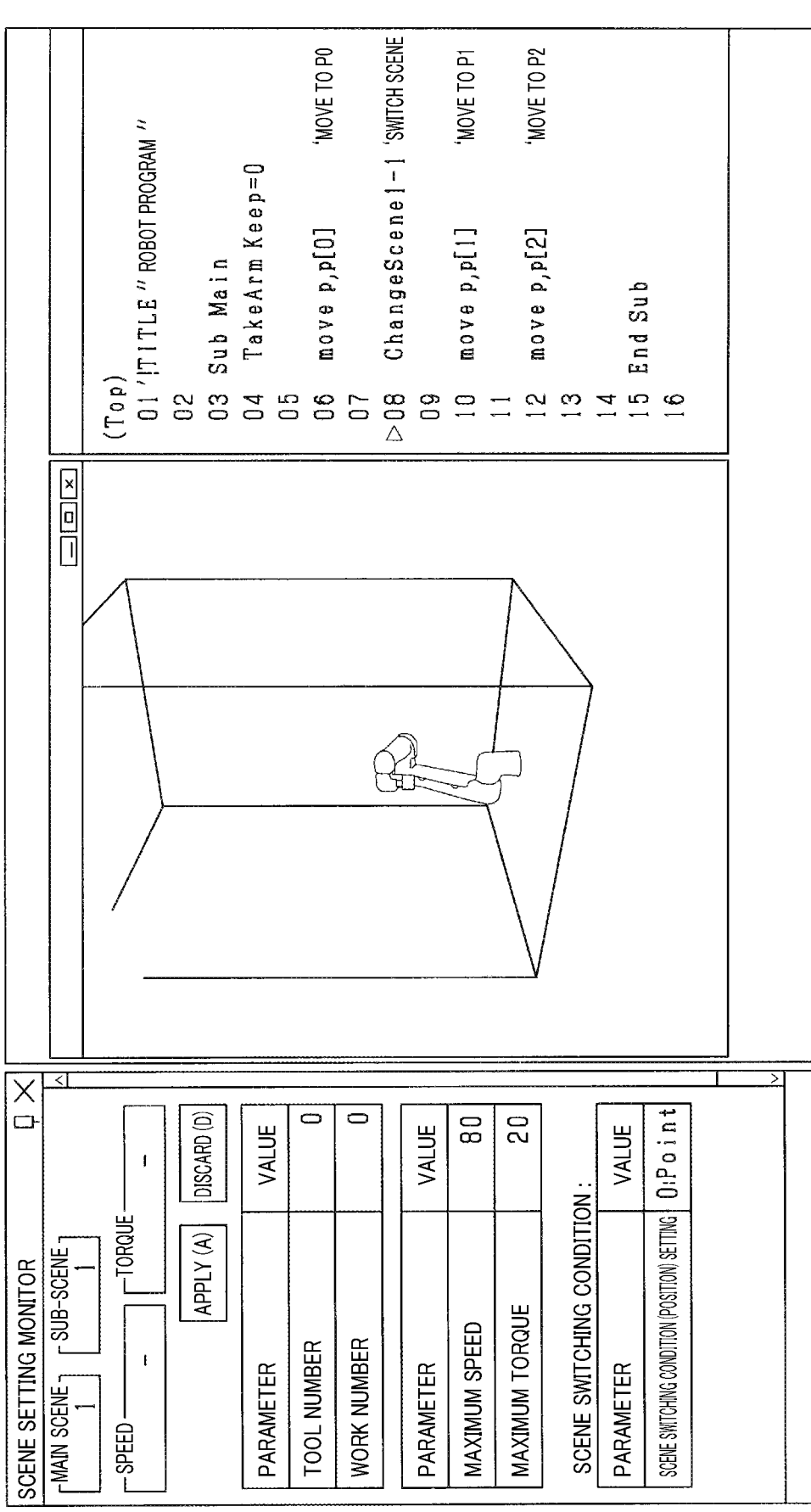
FIG. 7 shows a motion program during execution and limit parameters of a scene after switching according to an embodiment of the present disclosure.

For example, as shown in FIG. 7, in the command ChangeScene1-1 defined on the eighth line in the motion program, the sub-scene MS1S1 is specified. In this case, the scene setting monitor displays the main scene number 1 and the sub-scene number 1. Then, for example, the tool number and the workpiece number are displayed as parameters to be set in the main scene. Furthermore, the maximum speed, the maximum torque, and the scene switching condition are displayed as limit parameters to be set in the sub-scene. In this way, even when the scene is composed of a main scene and a sub-scene, the same operations as the present embodiment described above are performed in the robot control system 1, and the same effects are obtained.

Instead of the teaching pendant 40, the functions of the teaching pendant 40 (the display unit 41, the operation unit 42, the setting unit 43, and the switching unit 32 and the motion unit 33 during a simulation) may be realized by using a combination of a PC (personal computer), a monitor, a keyboard, a mouse, and the like, that have been connected to the robot control device 30.

The motion program of the robot 10 may be defined by a visual programming language. In this case, the commands of ChangeScene and the like may be substituted by the corresponding blocks and the like.

The temporarily stopping of the motion program and display of the limit parameters by the switching unit 32 are not limited to being performed in a simulation of the robot 10 by the teaching pendant 40 or a PC, and may be performed by actual motions of the robot 10. In this case, the functions of the switching unit 32 and the motion unit 33 are realized by the robot control device 30, and the functions of the display unit 41, the operation unit 42, and the setting unit 43 are realized by the teaching pendant 40. Furthermore, the temporarily stopping of the motion program and display of the limit parameters do not always have to be performed in the actual motions of the robot 10. For example, the switching unit 32 may set whether the motion program is temporarily stopped and the limit parameters are displayed based on an input from the user. That is, the switching unit 32 only needs to be capable of temporarily stopping the motion program and displaying the limit parameters.

The invention claimed is:

1. A robot control system comprising a processor, a memory, and a display, wherein the memory stores a program that is executed by the processor, and the processor displays, on the display, information relating to a robot, sets a limit parameter set for limiting a motion of the robot based on an input by a user, the limit parameter set corresponding to a scene in which the robot moves, and executes a motion program of the robot, where execution of the motion program:

(a) applies the limit parameter set to the robot, and switches the limit parameter set applied to the robot, (b) limits a motion of the robot according to the limit parameter set applied to the robot, and (c) stops execution of the motion program prior to switching from a first limit parameter set, which is the limit parameter set, to a second limit parameter set, which is a limit parameter set that is different from the first limit parameter set and is set before execution of the motion program, and displays the second limit parameter set on the display, wherein the second limit parameter set is specified without a user input by a command in the motion program when switching from the first limit parameter set to the second limit parameter set.

2. The robot control system according to claim 1, wherein the second limit parameter set is displayed in a foreground.

3. The robot control system according to claim 2, wherein the second limit parameter set is displayed inside a screen for displaying the limit parameter set, and the screen is displayed in the foreground when the second limit parameter set is displayed.

4. The robot control system according to claim 1, wherein the second limit parameter set is displayed using a screen for displaying the limit parameter set, and is displayed inside the screen.

5. The robot control system according to claim 1, wherein information relating to the robot includes an image showing the motion of the robot, and the second limit parameter set is displayed in a position that does not overlap the image showing the motion of the robot.

6. The robot control system according to claim 1, wherein the processor, after stopping execution of the motion program, continues to stop execution of the motion program until the user performs an operation to resume the motion program.

7. The robot control system according to claim 1, wherein the processor, in response to stopping execution of the motion program, makes the second limit parameter set editable.

8. The robot control system according to claim 1, wherein the processor displays the first limit parameter set on the display during execution of the motion program.

9. The robot control system according to claim 1, wherein the processor sets identification information of the limit parameter set based on an input by the user.

10. The robot control system according to claim 9, wherein the processor switches the limit parameter set applied to the robot to the limit parameter set that is identified by the identification information specified in the motion program.

11. The robot control system according to claim 1, wherein a value of the limit parameter set applied when the robot control system is started is an initial value that causes the robot to move safely.

12. The robot control system according to claim 1, wherein the limit parameter set includes a main parameter set that corresponds to a main scene, and one of a plurality of sub-parameter sets that each correspond to a plurality of sub-scenes, the plurality of sub-parameter sets are dependent on the main parameter set, the main parameter set includes at least one limit parameter, and each of the plurality of sub-parameter sets includes at least one limit parameter.

* * * * *